US 8,022,591 B2

(12) United States Patent
Chay et al.

(10) Patent No.: US 8,022,591 B2
(45) Date of Patent: Sep. 20, 2011

(54) FLUX SCREEN FOR GENERATORS

(75) Inventors: Pascal Chay, Exincourt (FR); Michael Jean-Marie Berlamont, Offemont (FR); Janusz Bialik, Bogatynia (PL); Johann Haldemann, Birr (CH); Lennart Diestel-Feddersen, Brugg (CH)

(73) Assignee: Alstom Technology Ltd., Baden (CH)

( * ) Notice: Subject to any disclaimer, the term of this patent is extended or adjusted under 35 U.S.C. 154(b) by 188 days.

(21) Appl. No.: 12/356,263

(22) Filed: Jan. 20, 2009

(65) Prior Publication Data

US 2009/0184594 A1    Jul. 23, 2009

(30) Foreign Application Priority Data

Jan. 22, 2008  (EP) ..................... 08100770

(51) Int. Cl.
*H02K 1/12* (2006.01)
(52) U.S. Cl. ........................................ 310/256
(58) Field of Classification Search .................. 310/256, 310/85, 86
See application file for complete search history.

(56) References Cited

U.S. PATENT DOCUMENTS

| | | | |
|---|---|---|---|
| 3,714,477 A * | 1/1973 | Gott ............................. 310/256 |
| 3,731,127 A | 5/1973 | Harrington | |
| 3,886,387 A | 5/1975 | Graham et al. | |
| 4,031,422 A | 6/1977 | Armor et al. | |
| 4,152,615 A | 5/1979 | Calfo et al. | |
| 4,258,281 A | 3/1981 | Calfo et al. | |
| 4,281,266 A | 7/1981 | Calfo et al. | |
| 5,652,469 A * | 7/1997 | Boardman et al. ............. 310/58 |
| 7,265,473 B2 * | 9/2007 | Salem et al. ........... 310/216.006 |

FOREIGN PATENT DOCUMENTS

| | | |
|---|---|---|
| DE | 2638908 A1 | 1/2009 |
| GB | 1307215 A | 2/1973 |
| JP | 56157230 A | 12/1981 |
| JP | 60091840 A | 5/1985 |
| JP | 60234437 A | 1/2009 |

OTHER PUBLICATIONS

Kang G.K.M. et al. "An Integrated Approach For the Calculation Of Losses And Temperatures In the End-Region Of Large Turbine Generators" IEEE Transactions On Energy Conversion, IEEE Service Center, Piscataway, NY US vol. 5, No. 1, Mar. 1, 1990, pp. 183-193.

* cited by examiner

*Primary Examiner* — Nguyen N Hanh
(74) *Attorney, Agent, or Firm* — Volpe and Koenig, P.C.

(57) ABSTRACT

A flux screen is provided for shielding a generator stator core from the magnetic field generated by end windings of the stator, wherein the flux screen comprises a frontside to be at least indirectly facing the end windings of the generator and a backside to be at least indirectly facing the stator core of the generator, and wherein the backside is provided with channels and/or grooves and/or pits.

13 Claims, 7 Drawing Sheets

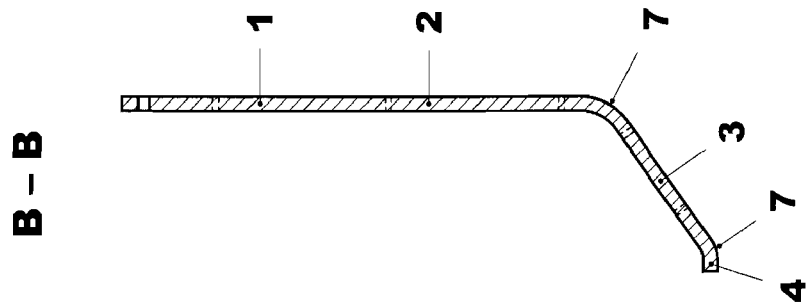
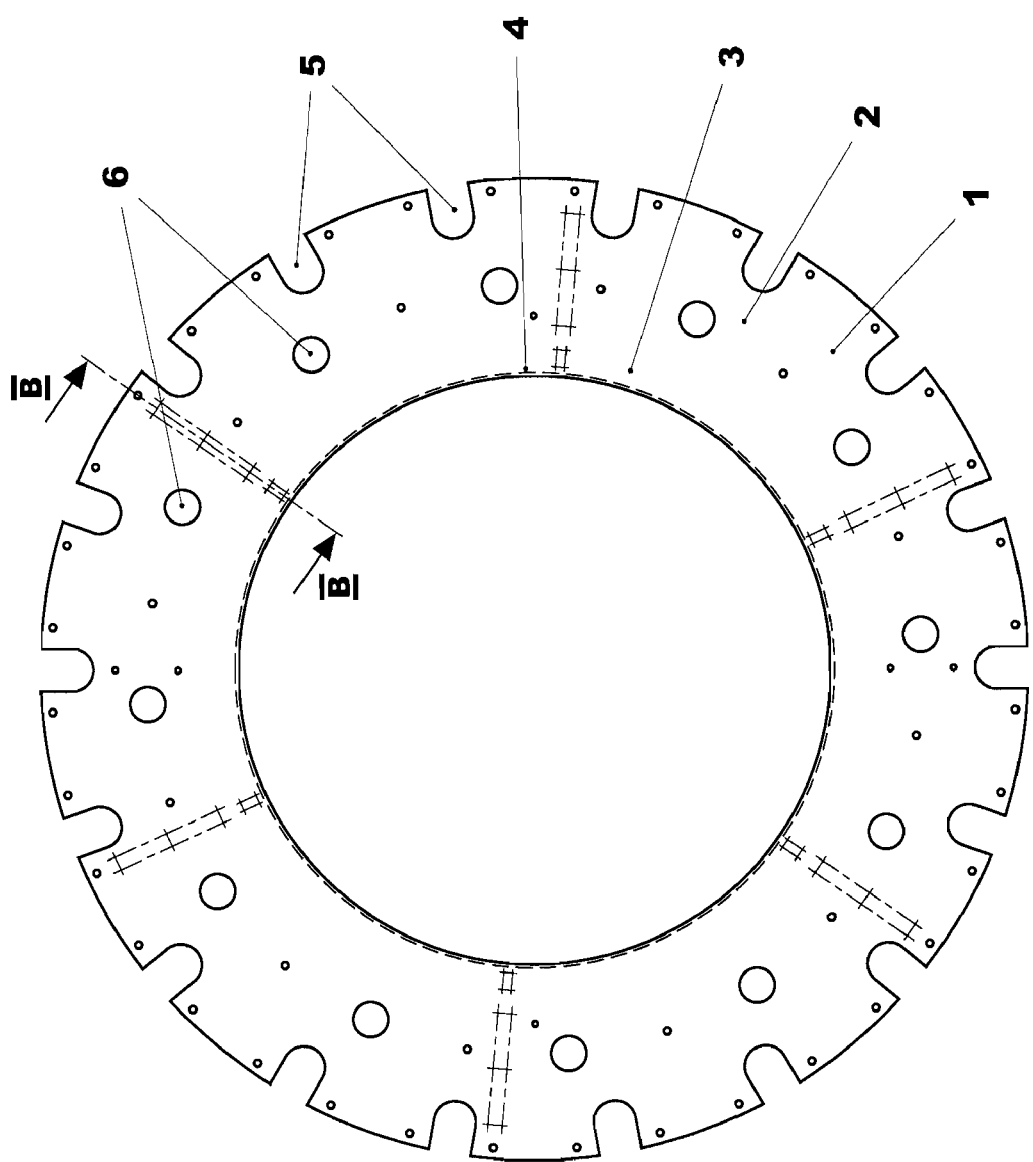
FIG. 1b
FIG. 1a

FLUX SCREEN FOR GENERATORS

FIELD OF INVENTION

The present invention relates to a flux screen for shielding a generator stator core from the magnetic field generated by end windings of the stator as well as to a generator equipped with such a flux screen.

BACKGROUND

The increasing size and power output of turbine generators have led to higher losses in the ends of the laminated stator core. Unless appropriate design innovations are incorporated into this region, these higher losses will lead to increased temperatures. These augmented temperatures in the vicinity of the stator coil can cause a reduction in the life of the stator coil insulation. If not properly controlled by design, this can limit the range of leading power factor operation of large generators.

Historically, end iron heating was resolved in the stator tooth area by splitting the last few inches of core iron and by stepping the tooth end packs. Providing radial cooling ducts in the ends of axially ventilated stator cores has proven to be satisfactory for existing ratings and machine sizes. However, the combination of several slits and radial ducts in the end pack region of the stator has the adverse effect of mechanically weakening the core end structure.

Other schemes had utilized flux shields in the tooth portion of the stator core. These eddy current shields are typically copper plates or loops situated directly in front of the stator teeth. They are conductive members of low magnetic permeability arranged to provide circulating currents which divert stray flux away from the tooth region. For highly rated machines, the currents induced in this type of shield produce extremely high losses, many times higher than that normally seen in the stator end iron. In most cases, liquid cooling of the shields may be required.

Additional losses in the stator core end packs result from axial magnetic flux caused by the rotor and stator end winding currents. Under normal machine operation, the terminal voltage is produced by magnetic flux which travels radially across the air gap and is distributed uniformly over the length of the core. In the end regions, this flux fringes from the ends of the rotor body to the stator end packs. This fringing flux enters the end packs at right angles to the plane of the lamination of the core. The loss generated by the ensuing eddy currents is considerably higher than the losses due to the same flux density entering parallel to the laminations. The net fringing flux is a vector sum of both the rotor and the armature components, varying in magnitude with both load and power factor. This flux continues to penetrate axially into the end pack until it can turn radially and join the peripherally travelling main synchronous flux system.

Flux screens consisting of several laminated sheets of material which are located between finger plates and end plates of a generator to reduce the axial flux striking the end region of the generator core are disclosed in different shapes for example in U.S. Pat. No. 4,152,615 as well as U.S. Pat. No. 4,281,266. A different type of shield for the end of the laminated dynamical electric machine stator core to reduce penetration of the stray end region flux into the tooth portion of the stator core is disclosed in U.S. Pat. No. 3,731,127 and U.S. Pat. No. 3,886,387.

A further design of a flux shield is disclosed in DE 2638908. Here the flux shield is mounted in the generator leaving an air gap behind the flux shield allowing cooling air to circulate in this air gap. In order to increase the heat transfer from the flux shield to the cooling air specific aids are provided. One possibility indicated in this document is to provide protrusions on the backside of the flux shield around which the cooling air flows.

SUMMARY

The present disclosure is directed to a flux screen for shielding a generator stator core from a magnetic field generated by end windings of a stator. The flux screen includes a frontside to be at least indirectly facing the end windings of the generator and a backside to be at least indirectly facing the stator core of the generator. The backside is provided with channels and/or grooves and/or pits.

The present disclosure is also directed to a generator, in particular for high power applications. The generator includes a stator with a plurality of laminations forming a stator core and is axially held together by at least one axially terminal clamping plate and further elements, with conductors provided in the stator core and end windings. The generator further includes at least one flux screen, which includes a frontside that, at least indirectly, faces the end windings of the generator. The flux screen also includes a backside that, at least indirectly, faces the stator core of the generator. The backside is provided with channels and/or grooves and/or pits. The flux screen is located between the clamping plate and the end windings.

BRIEF DESCRIPTION OF THE DRAWINGS

In the accompanying drawings preferred embodiments of the invention are shown in which:

FIGS. 1a and 1b show a flux screen according to the state-of-the-art, wherein in 1a) a front view from axial direction is shown and in 1b) a cut along B-B as indicated in 1a);

DETAILED DESCRIPTION OF THE PREFERRED EMBODIMENTS

Introduction to the Embodiments

Figure 2:
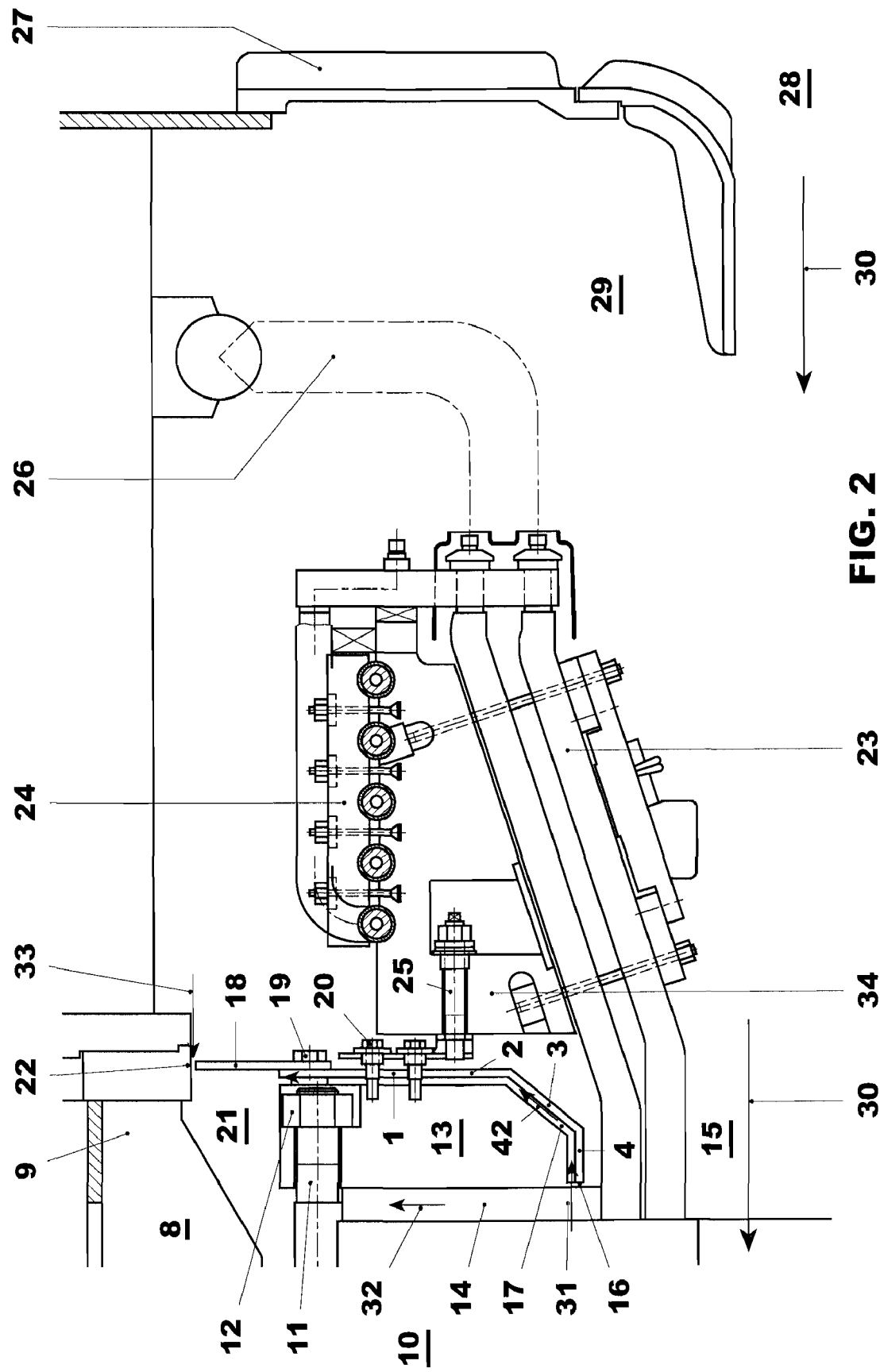
FIG. 2 shows an axial cut through a stator in the region of the end windings, the terminal region of the stator core and the flux screen.

It is therefore an object to provide improved designs of flux screens for generators, in particular for high power output generators in the range of above 1000 MW, i.e. specified for 1100 or even 1800 MW.

Specifically, the invention relates to an improved flux screen for shielding a generator stator core from the magnetic field generated by end windings of the stator. The flux screen comprises a frontside to be at least indirectly facing the end windings of the generator and a backside to be at least indirectly facing the stator core of the generator, and it is specifically characterised in that the backside is provided with channels and/or grooves and/or pits, especially in those regions which are exposed to a high magnetic flux and where the losses due to this magnetic flux and the corresponding heat generation in the flux shields are particularly high, and/or especially in those regions which can be actively cooled by a cooling medium like air, hydrogen, or liquids like water.

Indeed it was unexpectedly found that if such grooves are provided on the backside of a flux shield, preferably only on the backside of the flux shield, the shielding effect of the flux screen is hardly if not almost not influenced by these grooves, however the heat transfer to the cooling medium to carry away the heat generated due to the losses in the flux screen can be efficiently increased. Correspondingly therefore the solution is not only surprising because the person skilled in the art would have expected that reducing the thickness of the flux shield locally by grooves would also reduce the shielding effect, but also much more simple than for example the solution as provided in the above-mentioned state-of-the-art DE 2638908, since such grooves can e.g. simply be milled into the flux shield as a final production step. This increased heat transfer effect without reduction of the shielding effects in particular can be achieved if the residual thickness of the flux screen at the location of the grooves is still in the range of 5-15 mm, preferably in the range of 8-14 mm.

According to a first preferred embodiment of the flux shields according to the invention, the channels and/or grooves are oriented such that a regular flow direction of cooling medium along the backside is parallel to the channels and/or grooves. It is however also efficient if the direction of the regular flow of cooling medium encloses an angle with the channels and/or grooves of below 45°, preferably of below 30°, most preferably of below 15°. Like this the cooling medium can optimally penetrate into the grooves and a high heat transfer efficiency can be provided.

A further preferred embodiment is characterised in that the grooves are specifically provided in a region of the flux screen which is most exposed to the magnetic field generated by the end windings of the stator. For most generator designs this is the edge regions of the flux screen, either the essentially radial outer rim of the flux screen or the terminal inner rim of the flux screen.

Preferably, such a flux screen is of essentially annular shape with an essentially radial and preferably flat outer portion, and with a middle portion radially inwardly adjacent to said outer portion, wherein the middle portion is typically inclined with respect to the plane of the outer portion and forms a conical section of the flux screen. The conical section of the flux screen typically converges towards the inner part of the stator. Preferably the flux screen additionally comprises an axial portion radially inwardly adjacent to said middle portion, essentially of tubular shape. Preferentially in case of such a design of a flux shield, the grooves are provided in the radially inwards or outwards terminal edge region of the flux screen. Preferably in case of the absence of an axial portion the grooves are provided in the middle portion, and most preferably in the inner edge region thereof, and in case of presence of an axial portion the grooves are provided in said axial portion, preferably at the inner edge region thereof facing the stator core. Preferably, and specifically in case of the presence of grooves in said axial portion, the grooves are oriented in an essentially axial direction, wherein preferably every 0.2-20°, most preferably every 0.2-1.0° around the circumference grooves are provided. Correspondingly therefore preferentially more than 300, even more preferably more than 600 grooves are provided around the circumference of the flux screen.

A very high cooling efficiency can be achieved if the grooves located at the edge of the flux screen are open at the edge of the flux screen. This means that in case of a cooling medium flow into the space behind the flux screen in this region it can most efficiently enter into the grooves, and in case of a cooling medium flow out of the space behind the flux screen in this region the cooling medium can most efficiently enter the grooves and subsequently leave the slot behind the flux screen.

As concerns typical dimensions, the grooves preferentially have a depth which amounts to in the range of 10-50% of the thickness of the flux screen, preferably in the range of 20-40%. This means that for a thickness in the range of 14-20 mm, the depth is in the range of for example 2-8, preferably of 4-6 mm. The grooves preferentially have a width (in circumferential direction) in the range of 0.5-5 times the depth, preferably in the range of 1-2 times the depth of the grooves. For the above thickness of the shield the width is therefore in a range of 1-5, preferably of 2-4 mm. Typically the grooves have a (e.g. axial) length in the range of 20-500 mm, preferably in the range of 40-100 mm. In case of axial grooves provided in the above defined axial portion, the length of the grooves equals approximately the length of the axial portion or is less than 20% shorter than the length of the axial portion. In order to have further improved penetration into the grooves, those ends of the grooves which are not facing the terminal edge of the flux screen can be provided with a smooth rounding towards the surface of the backside.

Typical flux screens according to the state-of-the-art have a thickness of for example 12 mm. It has been surprisingly found that there is however an optimum range of the thickness of a flux screen, in particular in case of a flux screen made of the materials as defined below. Indeed it was found that there is a very distinct minimum of losses (and correspondingly of heat generation in the flux screen) if the flux screen has a thickness in the range of 15-20 mm, preferably of 16-18 mm, essentially independent of the shielding effect provided.

It should be noted that this specific finding that having a flux screen with a thickness in this mentioned specific and narrow range is highly beneficial with respect to the heat generated therein, which is in fact independent of the above discussed channels/grooves/pits in the backside of the flux shields. This development can be used independently, and of course can be advantageously used in combination with the grooves as defined herein.

Preferentially the flux screen is made of a highly electrically conductive material such as copper, preferably deoxidized low phosphorus copper (DLP). Preferably it is generally made of a single piece at least in as far as its thickness is concerned. However a laminated structure is also possible. The flux screen may also be composed of circumferential sections (e.g. 4 quadrants) and/or annular sections (e.g. a tubular axial section) joined and/or fused and/or soldered together.

For optimum shielding effects of the flux shield, it proves to be beneficial if the frontside is an essentially unstructured flat surface. It in addition proves to be beneficial if in case of several portions of the flux shield which are inclined with respect to each other, the transitions between these portions are smoothly rounded at least on the frontside, preferably also on the backside. Also generally the edges are preferably rounded.

The present invention further relates to a generator, in particular for high power applications, equipped with such a flux screen. Specifically, it relates to a generator comprising a stator with a plurality of laminations forming the stator core and axially being held together by at least one axially terminal clamping plate as well as further elements like through bolts and screws, with conductors provided in the stator core and end windings, wherein it comprises at least one flux screen as given above, preferentially located between the clamping plate and the end windings.

In such a generator, the flux screen can be attached at least indirectly to the clamping plate such that between the clamping plate and the backside there is at least in regions of the flux screen a free space or cooling channel through which cooling medium, preferably selected from air, hydrogen, water or other liquids, is fed preferably in an axial and/or radial direction.

Preferably the distance between the clamping plate and the backside of the flux screen is in the range of 10-50 mm, preferably in the range of 12-20 mm. Most preferably essentially the whole backside (with the exception of e.g. distancing elements and fixation elements) of the flux screen is loaded with cooling medium.

Further embodiments of the present invention are outlined in the dependent claims.

DETAILED DESCRIPTION

Referring to the drawings, which are for the purpose of illustrating the present preferred embodiments of the invention and not for the purpose of limiting the same, FIG. 1 shows a flux screen 1 according to the state of the art. FIG. 1a) shows such a flux screen in a view along the main axis of a generator, i.e. along the direction of the shaft of the electrical machine. FIG. 1b) shows a cut along the line B-B as indicated in FIG. 1a). Such a flux screen according to the state of the art typically has a thickness of around 10 to 12 millimetres and comprises several sections. One section is essentially a flat annular radial portion 2, which on its circumference is provided with openings 5 for fixing the ventilation screen (see discussion of FIG. 2) to the flux screen 1. Furthermore this radial portion 2 is provided with holes 6, by which the whole flux screen can be attached to the clamping plate 13 (see FIG. 2). Towards the radial inner side this radial portion 2 is followed by an inclined portion 3 which therefore forms a conical section of the flux screen 1 converging towards the inner part of the stator. In many cases additionally there is provided an adjacent axial portion 4, which is essentially a tubular section of the flux screen 1 and which extends further into the stator core. As indicated in FIG. 1b) typically the transitions 7 between the different portions 2, 3, 4 are rounded such as to optimise the shielding effect of the flux screen. Typically also the edge regions of the flux screen are rounded. Such a flux screen typically has an out diameter of in range of 1,000 to 4,000 millimetres, and an inner diameter of in range of 800 to 3,000 millimetres, depending on the size and power output of a corresponding generator.

FIG. 2, shows an axial section through the stator of such an electrical machine, indicates where such flux screen 1 is located in the general setup. The stator 8 comprises a housing 9 surrounding the electrical parts of the stator. The stator comprises a core 10 which is composed of sheets or laminations, which typically have slots into which the conductors of the stator are laid. These sheets or laminations are held together in an axial direction by through bolts 11 and corresponding end screws which are screwed on to end threadings of the through bolts 11. The terminal piece of this stator core is usually given by a so called clamping plate 13, which serves as the abutment of the end screw 12 and which axially terminates the stator core. In this arrangement, between the stator core laminations 10 and the clamping plate 13 there is provided a radial air gap 14 which typically has a width of several tens of millimetres. This air gap is provided to allow the radial circulation of cooling medium, which will be discussed in more detail below.

The end windings 23 of the stator 8 are located outside of the stator and external to the clamping plate. The end turns or end windings 23 of the stator are fixed by the fasteners 25 to the stator core, and are surrounded by the circular collectors 24 which collect the current generated in the stator.

The end windings 23 generate a stray magnetic field which will, if not shielded, negatively affect the stator core. Therefore, in order to shield the stator core 10 from this magnetic field, a flux screen 1 is provided next to the clamping plate 13. This flux screen 1 has a shape as discussed in the context of FIG. 1 and is attached to the clamping plate 13 by screws 20 or the like. The flux screen 1 is mounted on the clamping plate by leaving a small air gap of approximately 10 to 20 millimetres between the clamping plate 13 and the flux screen 1. Indeed the general shape of the flux screen essentially follows the shape of the clamping plate such that the cooling medium channel 17 provided between the flux screen and the clamping plate 13 has an essentially constant width over the full radial pathway of the cooling medium.

In addition, a ventilation screen 18 is attached to the flux screen 1 on its radially outer circumferential side by screws 19, leaving only a small gap or entrance slot 22 between the outer circumferential rim of the ventilation screen and the housing 9 of the stator 8.

Furthermore, for the sake of completeness, the water cooling pathway 26 for the conductor bars of the stator are schematically indicated with reference numeral 26.

Furthermore there is provided a hydrogen guide 27, named so in case of hydrogen acting as a cooling medium which for the system as displayed herein, namely for a high power system with a power generation in the range of 1,000-2,000 megawatts is essentially the only useful cooling medium.

In such a setup, typically a ventilation system located in or close to the ventilator aspiration area 28 forces cooling medium in an axial initial flow direction 30 into the machine gap 15 and to the stator region. The cooling air subsequently penetrates through the stator core and, in the terminal regions, enters the above-mentioned air gap 14 (indicated by arrow 32). As the radially inner edge of the flux screen leaves a gap 16 open towards this air gap 14, cooling air 31 also enters the spacing 17 between the flux screen 1 and the clamping plate 13. This cooling air travels first axially, then at an inclination angle (arrow 42) and then radially behind the flux screen 1, to leave the interspace 17 behind the ventilation screen 18 to enter the room 21 between the housing, stator core and behind the ventilation screen.

As the magnetic field to be shielded by the flux screen 1 leads to losses in the flux screen and to a corresponding generation of heat in the flux screen, this circulation of cooling medium behind the flux screen is important to make sure that there is no over heating of the flux screen 1 in those regions which are exposed to the highest magnetic fields. It is noted that in front of the flux screen, indicated with the reference numeral 34, there is normally no forced circulation of cooling medium, normally in this area cooling is simply effected by convection.

It was now found that, in particular for four pole generators with higher output, the temperature level in such a setup remains high and may reach critical levels in spite of the fact that the backside of the flux screen is cooled by this cooling channel. Therefore further improvements are necessary.

A first improvement was found based on the surprising fact that there is a optimum thickness of the flux screen as concerns the losses generated therein. Indeed calculations and experimental evaluations have shown that there is a distinct minimum of losses as a function of the thickness of the flux screen, and this is graphically illustrated in FIG. 3.

Figure 3B:
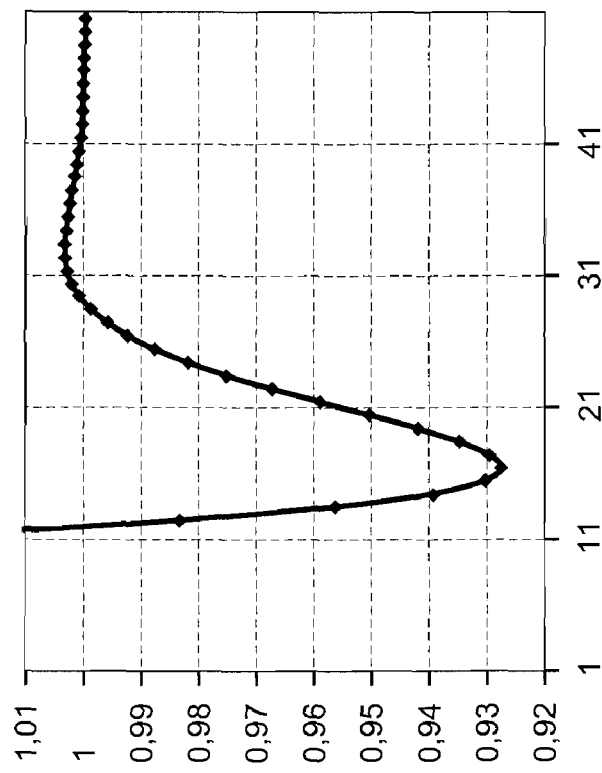
FIGS. 3a and 3b show the losses as a function of the thickness t of the flux screen.
Figure 3A:
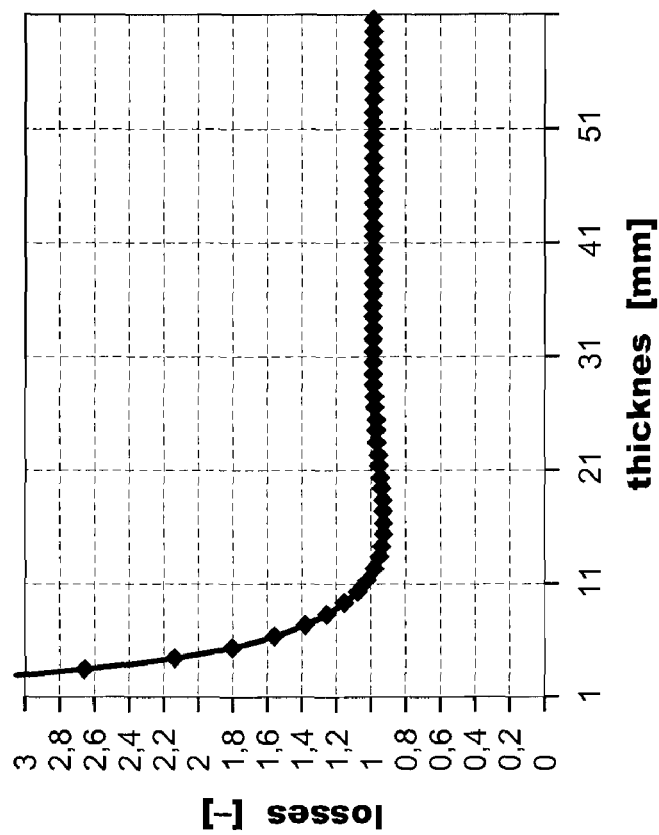

It is noted that conventional flux screens have a thickness of 12 millimetres, which is actually quite far left of the optimum as indicated in FIG. 3b) in more detail. Indeed the smallest losses, and correspondingly the smallest heat generation, takes place if the flux shield has a thickness in the range of 15-20 millimetres, or more specifically in a range of 16-18 millimetres. Going to a smaller thickness not only increases the losses but also reduces the shielding effect, and going to larger thickness again leads to an increase of losses and does not significantly increase the shielding effect leading however to increased weight and costs of the flux shield.

Figure 4:
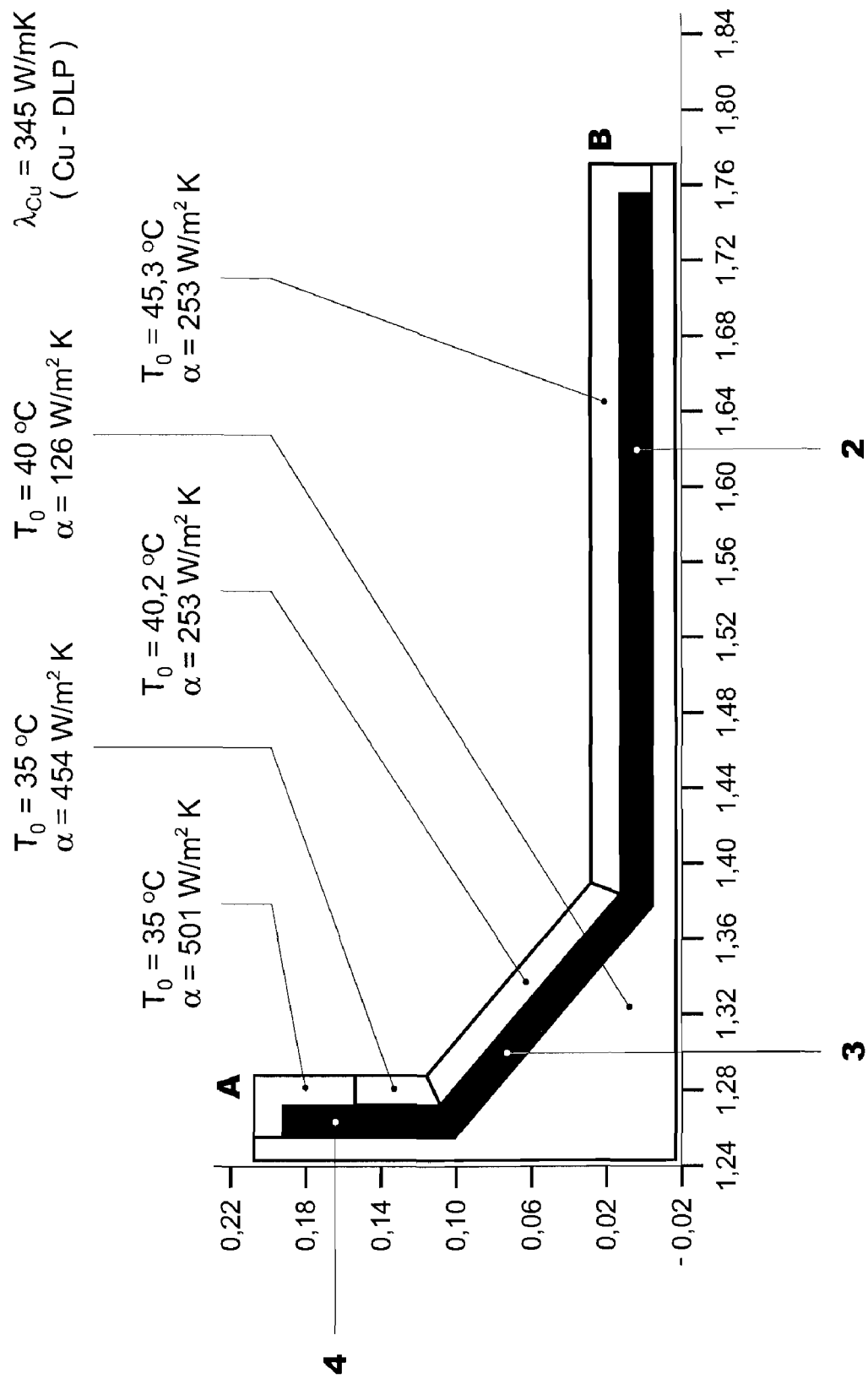
FIG. 4 shows the boundary conditions for thermal calculation.

Based on this finding, additional improvements were searched for, and taking a thickness of 16 millimetres of the flux screen, calculations were made to find out where the most heat is generated and where additional cooling has to be provided. For this model, calculations were carried out with the specifics as indicated in FIG. 4, which indicates the conditions for a hydrogen cooling medium flow on the top right side of the flux screen entering at position A with a temperature of 35 degrees centigrade, flowing along the backside of the flux screen and leaving this area at position B with a temperature of 45.3 degrees centigrade. On the front side a temperature of 40 degrees centigrade without any forced cooling medium flow is assumed. The calculations were carried out for copper-DLP with a convectivity of $\mu_{cu}$ of 345 W/mK. The calculations led to the heat transfer coefficients $\alpha$ as indicated in FIG. 4 in the different sections along the flow part of cooling medium from A to B.

Figure 5:
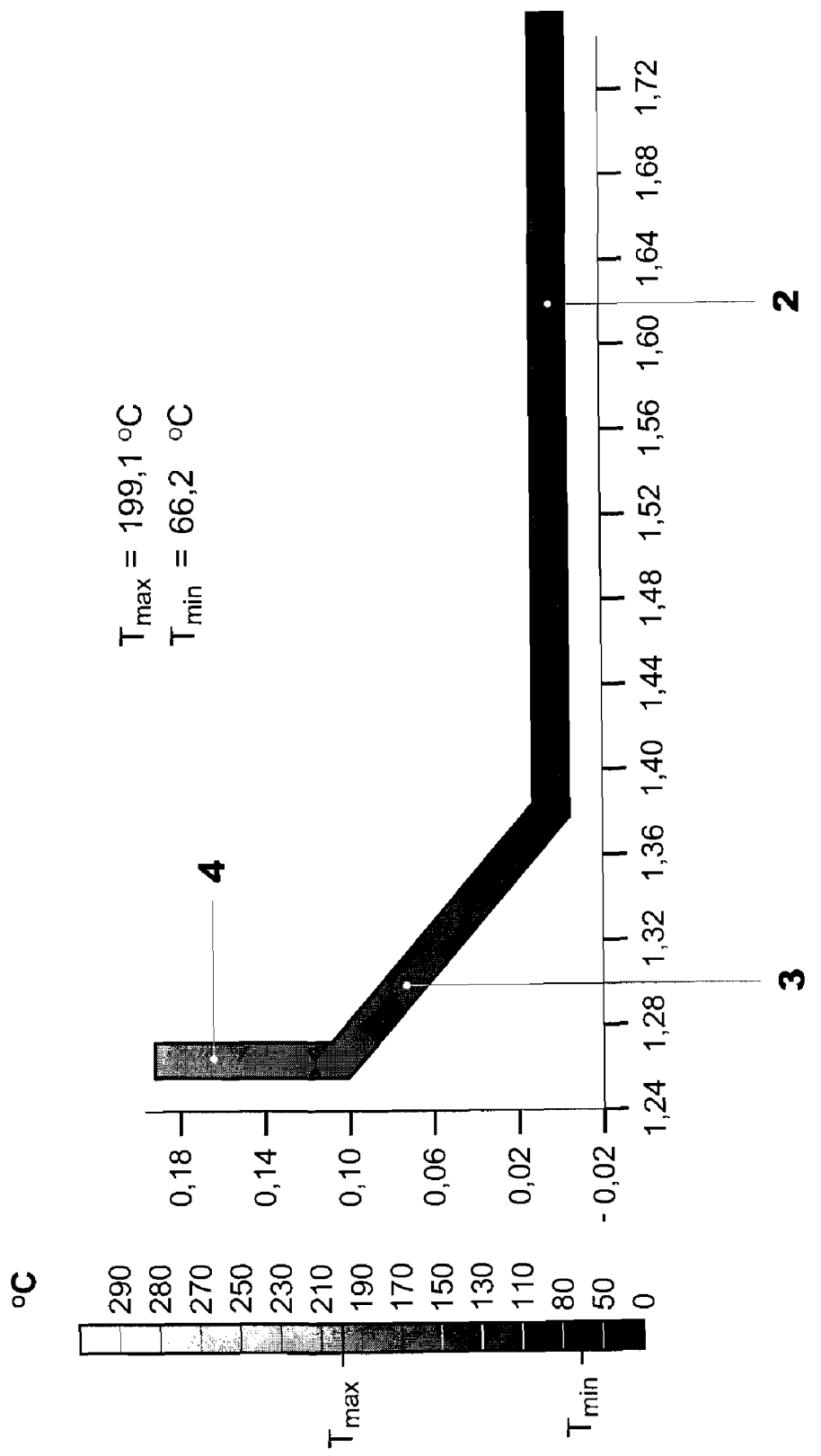
FIG. 5 shows the flux screen temperature distribution in a flux screen with a thickness of 16 mm without grooves.

Assuming a flux screen 1 with a thickness of 16 millimetres this leads to a temperature distribution as graphically displayed in FIG. 5. One notes that the strongest affected region is the axial portion 4 in particular in the edge region. Maximum temperatures of almost 200 degrees centigrade are generated in this region, while in the radial portion 2 temperatures in the range of not more than 70 degrees centigrade are reached. Also at an elevated temperature is the radial rim of the flux screen 1, given on the very right side of FIG. 5. Indeed these losses occur where the magnetic field which is to be shielded is strongest. The calculated values were obtained for hydrogen as cooling medium and a pressure of 4 bar.

Figure 6:
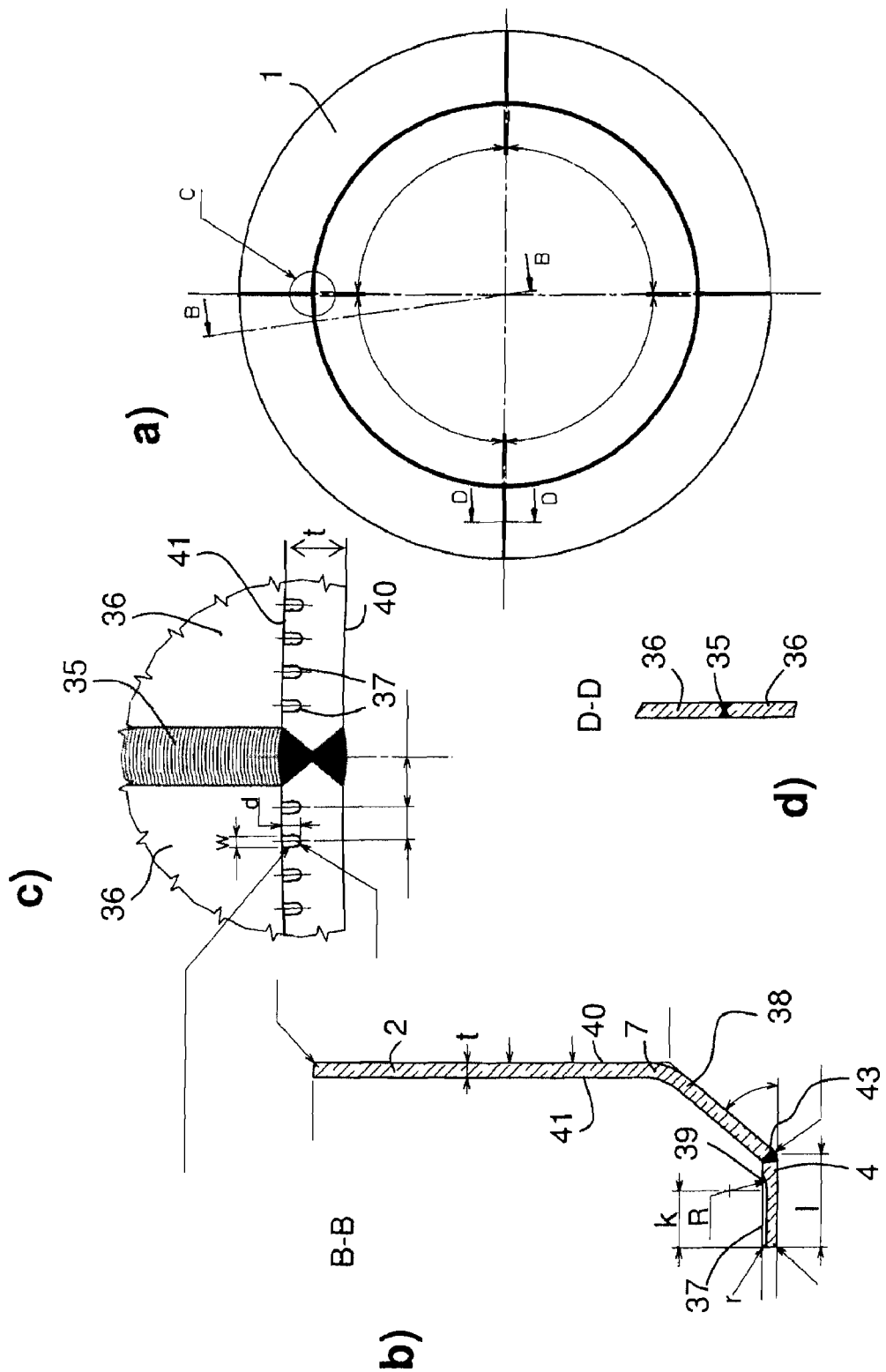
FIGS. 6a-6d show an improved flux screen design with grooves, wherein FIG. 6a) shows the front view from an axial direction, FIG. 6b) shows a cut along B-B in a), FIG. 6c) shows the detail C as indicated in FIG. 6a) and FIG. 6d) shows the section D-D as indicated in FIG. 6a)

In order to increase the heat transfer from the flux screen 1 to the cooling medium a grooved structure as indicated in FIG. 6 is proposed. Here, the flux screen 1 is modified in that in the axial portion 4 axially extending grooves 35 are provided. These grooves have a depth d of 5 millimetres, and a width w of 3 millimetres, and are located every 0.3-0.5 degrees along the circumference of the axial portion 4. The grooves 37 have almost the same length as the axial portion 4, indeed the grooves have length of 60-70 millimetres for an axial length of the axial portion 4 of 1 approximately 90-100 millimetres. The grooves 37 are, as visible in FIG. 6c) open towards the entrance slot, i.e. they are open at the inner edge of the axial portion. Thereby the cooling medium can optimally enter these cooling slots at the position as given with the reference numeral 16 in FIG. 2. To optimise the outflow of cooling medium out of the grooves 37 and to avoid vortexes in the channels, the outlet region 39 is provided with a rounding as indicated with R, the radius R can for example be around 40 millimetres.

As one can see also from FIG. 6 in this case the flux screen is made of several quadrants which are joined with each other by radial soldering lines 35 and in addition to that the axial portion 4 is provided as a tubular element which is soldered to these quadrants 36 by a circumferential solder line 43. In a setup like this, where the thickness t of the flux screen is 16 millimetres, the residual thickness below the bottom of the grooves 37 is still sufficient to provide the necessary shielding effect. As indicated above, preferentially the front side 40 of the flux screen is essentially unstructured and has a smooth flat surface.

Figure 7:
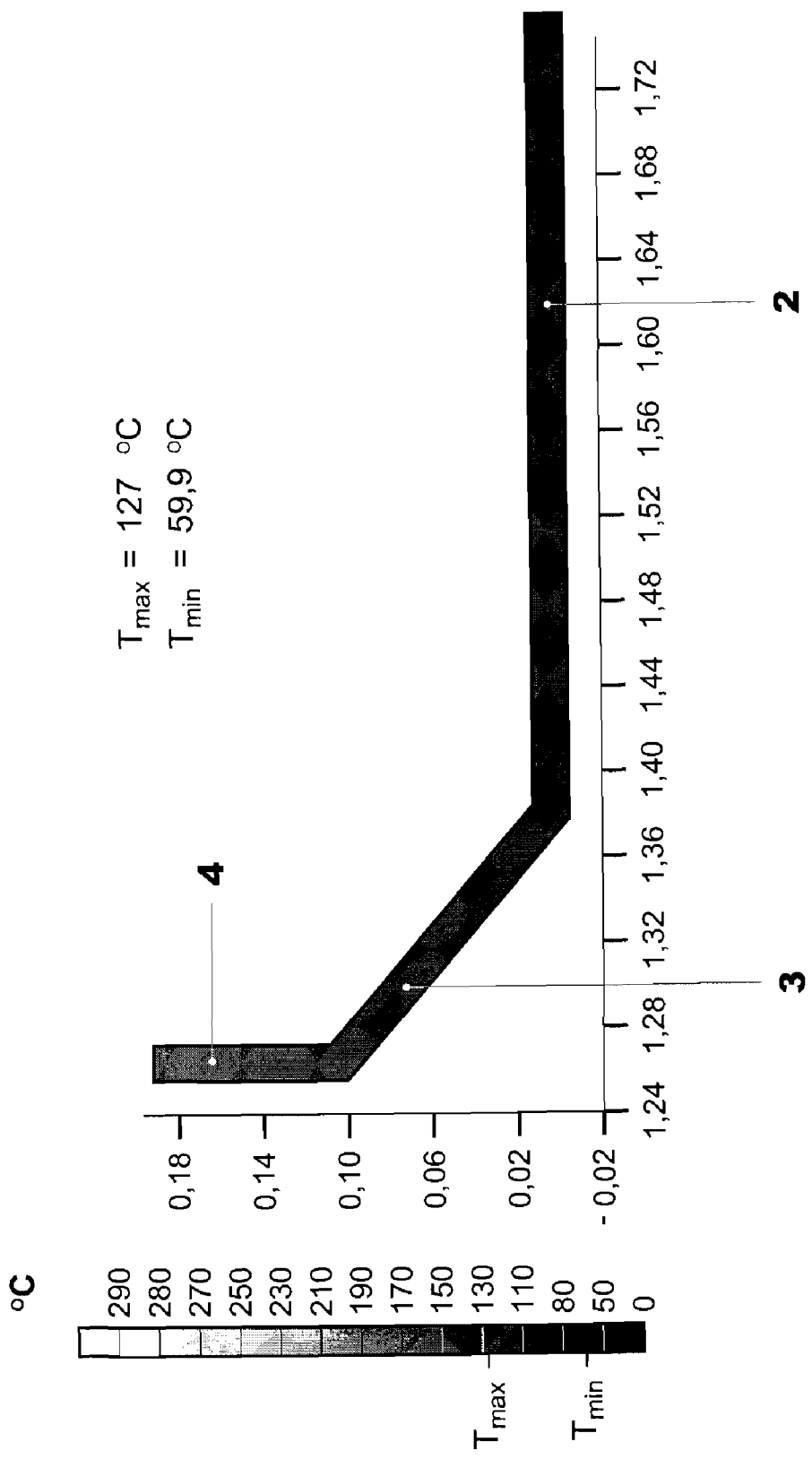
FIG. 7 shows the flux screen temperature distribution in a flux screen with a thickness of 16 mm with grooves.

Taking a setup as indicated in FIG. 6 and carrying out the same calculations as discussed above, one obtains a temperature distribution for a shield with grooves according to FIG. 6 as given in FIG. 7. One notes that the grooves have the effect that in the region with the most losses, i.e. in the region of the axial portion 4, the maximum temperature can be reduced by more than 70 degrees centigrade, and the value of 127 degrees centigrade is clearly such that damages to the system due to over heating can be avoided. It is demonstrated that the proposed grooves indeed have a very high impact on the cooling efficiency without however diminishing the shielding effect of the flux screen.

LIST OF REFERENCE NUMERALS 1 flux screen
2 radial portion of 1
3 inclined portion of 1
4 axial portion of 1
5 openings for fixing the ventilation screen to the flux screen
6 holes for fixing the flux screen to the clamping plate
7 rounded edges
8 stator
9 housing/frame of 8
10 core of 8 comprising sheets or a laminations
11 through bolts for keeping the core together
12 end screws for 11
13 clamping plate
14 air gap between 10 and 13, distancing by pressing us (not displayed)
15 machine gap
16 entrance slot between 13 and 1
17 spacing between 13 and 1
18 ventilation screen
19 screws for fixing the ventilation screen to the flux screen
20 screws for fixing the flux screen to the clamping plate
21 room between housing, stator core and behind ventilation screen
22 entrance slot between 18 and 9
23 end turns of the stator windings
24 circular collectors of the stator windings
25 fixation of the end turns
26 water cooling for conductor bars (schematically)
27 hydrogen guide
28 ventilator aspiration area
29 end winding area
30 axial initial flow of cooling medium (hydrogen)
31 entrance of cooling medium into 17 at 16
32 radial flow of cooling medium in 14
33 entrance of cooling medium into 21 through 22
34 space in front of 1
35 radial soldering line
36 quadrants of 1
37 groove
38 circumferential soldering line
39 downstream outlet region of 37
40 frontside of flux screen
41 backside of flux screen 42 flow of cooling medium on backside of flux screen
43 circumferential soldering line
t thickness of 1
w width of 37
d depth of 37
r radius on bottom of 37
R radius at 39
l axial length of 4
k axial length of 37

What is claimed is:

1. Flux screen (1) for shielding a generator stator core (10) from a magnetic field generated by end windings (23) of a stator (8), wherein the flux screen comprises a frontside (40) to be at least indirectly facing the end windings (23) of the generator and a backside (41) to be at least indirectly facing the stator core (10) of the generator, and wherein the backside (41) is provided with channels or grooves (37), wherein the screen is of an essentially annular shape with an essentially radial outer portion (2), with a middle portion (3) radially inwardly adjacent to said outer portion (2), the middle portion (3) is inclined with respect to the plane of the outer portion (2) and forms a conical section of the flux screen (1), and preferably with an axial portion (4) radially inwardly adjacent to said middle portion (3).

2. Flux screen (1) according to claim 1, wherein channels or grooves (37) are oriented such that a regular flow direction of cooling medium (42) along the backside (41) is parallel to the channels or grooves (37) or encloses an angle with the channels or grooves (37) of below 45°, preferably of below 30°, most preferably of below 15°.

3. Flux screen (1) according to claim 1, wherein the grooves (37) are provided in a region of the flux screen (1) which is most exposed to the magnetic field generated by the end windings (23) of the stator (8).

4. Flux screen (1) according to claim 1, wherein the grooves (37) are provided in a radially inwards or outwards terminal edge region of the flux screen (1), wherein preferably in case of the absence of an axial portion (4) the grooves (37) are provided in the middle portion (3) and in case of presence of an axial portion (4) the grooves are provided in said axial portion (4).

5. Flux screen (1) according to claim 1, wherein the grooves (37) are open at an edge of the flux screen (1).

6. Flux screen according to claim 1, wherein the screen has a thickness (t) in the range of 15-20 mm, preferably of 16-18 mm.

7. Flux screen according to claim 1, wherein the screen is made of a highly electrically conductive material such as copper, preferably deoxidized low phosphorus copper (DLP), and is preferably made of a single piece or of circumferential sections (36) or annular sections joined or fused or soldered together.

8. Flux screen according to claim 1, wherein the frontside (40) is an essentially unstructured flat surface, and wherein preferably in case of several portions (2-4) transitions (7) between these portions (2-4) is smoothly rounded at least on the frontside (40), preferably also on the backside (41).

9. Flux screen (1) for shielding a generator stator core (10) from a magnetic field generated by end windings (23) of a stator (8), wherein the flux screen is of an essentially annular shape with an essentially radial outer portion (2), with a middle portion (3) radially inwardly adjacent to said outer portion (2), wherein the middle portion (3) is inclined with respect to the plane of the outer portion (2) and forms a conical section of the flux screen (1), and preferably with an axial portion (4) radially inwardly adjacent to said middle portion (3) and comprises a frontside (40) to be at least indirectly facing the end windings (23) of the generator and a backside (41) to be at least indirectly facing the stator core (10) of the generator, and wherein the backside (41) is provided with at least one of channels, grooves (37) or pits provided in a radially inwards or outwards terminal edge region of the flux screen (1), wherein preferably in case of the absence of an axial portion (4) the grooves (37) are provided in the middle portion (3) and in case of presence of an axial portion (4) the grooves are provided in said axial portion (4), wherein the grooves (37) are oriented in an essentially axial direction, wherein preferably every 0.2-20°, most preferably every 0.2-1.0° around the circumference grooves (37) are provided.

10. Flux screen (1) for shielding a generator stator core (10) from a magnetic field generated by end windings (23) of a stator (8), wherein the flux screen comprises a frontside (40) to be at least indirectly facing the end windings (23) of the generator and a backside (41) to be at least indirectly facing the stator core (10) of the generator, and wherein the backside (41) is provided with at least one of channels, grooves (37) or pits, wherein the grooves (37) have at least one of a depth (d) which corresponds to in the range of 10-50% of the thickness (t) of the flux screen, preferably in the range of 20-40%, or a width (w) in the range of 0.5-5 times the depth (d), preferably in the range of 1-2 times the depth (d) of the grooves (37) or a length in the range of 20-500 mm, preferably in the range of 40-100 mm.

11. Generator, in particular for high power applications, comprising a stator (8) with a plurality of laminations forming a stator core (10) and axially being held together by at least one axially terminal clamping plate (13) as well as further elements (11, 12), with conductors provided in the stator core (10) and end windings (23), the generator further comprises at least one flux screen (1), which comprises a frontside (40) to be at least indirectly facing the end windings (23) of the generator and a backside (41) to be at least indirectly facing the stator core (10) of the generator, the backside (41) is provided with at least one of channels, grooves (37) or pits, the flux screen being located between the clamping plate (13) and the end windings (23), wherein the screen is of an essentially annular shape with an essentially radial outer portion (2), with a middle portion (3) radially inwardly adjacent to said outer portion (2), wherein the middle portion (3) is inclined with respect to the plane of the outer portion (2) and forms a conical section of the flux screen (1), and preferably with an axial portion (4) radially inwardly adjacent to said middle portion (3).

12. Generator according to claim 11, wherein the flux screen (1) is attached at least indirectly to clamping plate (13) such that between the clamping plate (13) and the backside (41) there is a free space (17) through which cooling medium, preferably selected from air, hydrogen, water or other liquids, is circulated preferably in at least one of an axial or radial direction.

13. Generator according to claim 11, wherein a distance between the clamping plate (13) and the backside (41) of the flux screen (1) is in the range of 10-50 mm, preferably in the range of 12-20 mm, and most preferably essentially the whole backside (41) of the flux screen (1) is loaded with cooling medium.

* * * * *